United States Patent
Qian et al.

(10) Patent No.: US 9,930,163 B2
(45) Date of Patent: Mar. 27, 2018

(54) METHOD OF CONTROLLING A TERMINAL AND ASSOCIATED ANCILLARY DEVICE

(71) Applicant: Huizhou TCL Mobile Communication Co., Ltd, Huizhou, Guangdong (CN)

(72) Inventors: Wen Qian, Huizhou (CN); Yu Zheng, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 15/305,087

(22) PCT Filed: Mar. 23, 2016

(86) PCT No.: PCT/CN2016/077100
§ 371 (c)(1),
(2) Date: Oct. 18, 2016

(87) PCT Pub. No.: WO2017/005011
PCT Pub. Date: Jan. 12, 2017

(65) Prior Publication Data
US 2017/0155752 A1    Jun. 1, 2017

(30) Foreign Application Priority Data
Jul. 3, 2015  (CN) .......................... 2015 1 0395294

(51) Int. Cl.
*H04M 1/725*  (2006.01)
(52) U.S. Cl.
CPC ... *H04M 1/72527* (2013.01); *H04M 1/72552* (2013.01)

(58) Field of Classification Search
None
See application file for complete search history.

(56) References Cited

U.S. PATENT DOCUMENTS

2014/0378185 A1* 12/2014 Chung .................... G06F 1/163
                                                                            455/557
2015/0111558 A1*  4/2015 Yang ..................... G04G 21/04
                                                                            455/418
(Continued)

FOREIGN PATENT DOCUMENTS

CN         2826859 Y      10/2006
CN       201571111 U       9/2010
(Continued)

OTHER PUBLICATIONS

International Search Report on corresponding PCT application (PCT/CN2016/077100) from International Searching Authority (CN) dated Jul. 1, 2016.

*Primary Examiner* — David Bilodeau

(57) ABSTRACT

A method of controlling a terminal and an associated ancillary device are disclosed. The method includes: the ancillary device receiving information of an unprocessed event from the terminal, wherein the information contains a type and a serial number of the unprocessed event; receiving a predefined operation from a user and producing a tag for the unprocessed event accordingly, wherein the tag contains the type and serial number of the unprocessed event; and sending the tag to the terminal, so that the terminal generating a corresponding notification message according to the tag. Thus, the unprocessed event present on the terminal can be directly processed through the ancillary device, and the terminal can eventually generate a notification message to notify the user of the unprocessed event.

21 Claims, 2 Drawing Sheets

(56) References Cited

U.S. PATENT DOCUMENTS

| | | | |
|---|---|---|---|
| 2015/0350403 A1* | 12/2015 | Eim | G06F 1/163 |
| | | | 455/420 |
| 2015/0362999 A1* | 12/2015 | Kim | G06F 3/017 |
| | | | 715/716 |
| 2016/0014266 A1* | 1/2016 | Bhatt | H04M 1/7253 |
| | | | 455/556.1 |
| 2017/0118348 A1* | 4/2017 | Dotan-Cohen | H04M 7/0033 |

FOREIGN PATENT DOCUMENTS

| CN | 203606632 U | 5/2014 |
|---|---|---|
| CN | 104519151 A | 4/2015 |
| CN | 104836897 A | 8/2015 |
| CN | 105162979 A | 12/2015 |

* cited by examiner

METHOD OF CONTROLLING A TERMINAL AND ASSOCIATED ANCILLARY DEVICE

TECHNICAL FIELD

This disclosure relates generally to mobile communications, and more particularly, to a method of controlling a terminal and an associated ancillary device.

BACKGROUND

Mobile terminals, especially smart terminals, have become an indispensable part of people's lives. In the meantime, people are having higher and higher functional requirements for smart terminals.

As smart terminals become increasingly functional, to meet the operational requirements of some new features as well as to elevate the user experience, smart terminals are having increasingly larger screens, which may on one hand bring convenience to people's lives, but may on the other hand make smart terminals unhandy. Typically, users tend to place their smart terminals in bags; hence, when the user is in a noisy environment, he may not be able to check in time the unprocessed events on the phone, such as a call or a short message.

In light of this, to mitigate the unhandiness issue accompanying the enrichment of smart terminals' functions, typically an additional ancillary device may be worn to facilitate the user for auxiliary control of the smart terminal, such as a smart watch or smart glasses. However, no matter what kind of ancillary device, it can only receive information from the terminal but cannot actively return signals to control the terminal, hence a single-way control, that is, the user cannot interact with the terminal via the ancillary device, defeating the purpose for which the ancillary device is intended.

SUMMARY

A principal technical problem to be addressed by the disclosure is to provide a method of controlling a terminal and an associated ancillary device, to utilize the ancillary device to directly deal with the unprocessed events on the terminal.

According to an aspect of the disclosure, a method of controlling a terminal is disclosed that includes:

receiving, by an ancillary device, information of an unprocessed event from the terminal that contains a type and a serial number of the unprocessed event;

receiving, by the ancillary device, a predefined input operation from a user, and producing a tag for the unprocessed event that contains the type and the serial number of the unprocessed event; and sending, by the ancillary device, the tag to the terminal, and generating, by terminal, a corresponding notification message according to the tag.

In some embodiments, the type of the unprocessed event may include a call, a short text message, a multimedia message, or an email.

In some embodiments, the block of the ancillary device receiving the predefined input operation from the user and producing the tag that contains the type and the serial number of the unprocessed event may include:

detecting, by the ancillary device, an interactive operation of the user, and producing the tag for the unprocessed event according to the interactive operation.

In some embodiments, the interactive operation may include a touch operation, keystrokes, or a voice control operation.

In some embodiments, the block of the ancillary device receiving the predefined input operation from the user and producing the tag that may contain the type and the serial number of the unprocessed event may include:

receiving, by the ancillary device, a recording command from the user and thus triggering a recording function to record a voice command issued from the user, and generating for the unprocessed event the tag corresponding to the voice command.

In some embodiments, the method may further include, before the block of the ancillary device receiving the predefined input operation from the user and producing the tag that contains the type and the serial number of the unprocessed event:

performing a responsive event corresponding to the type of the unprocessed event, whereby the user takes an action in response to the responsive event.

According to another aspect of the disclosure, an ancillary device is provided that includes a receiver module and a transmitter module. The receiver module may be configured to receive an unprocessed event from a terminal that contains a type and a serial number of the unprocessed event. The receiver module may be further configured to receive a predefined input operation from a user and accordingly produce a tag for the unprocessed event that contains the type and the serial number of the unprocessed event. The transmitter module may be configured to send the tag to the terminal, so that the terminal may generate a corresponding notification message according to the tag.

In some embodiments, the receiver module may be configured to specifically detect an interactive operation performed by a user and produce the tag for the unprocessed event according to the interactive operation.

In some embodiments, the receiver module may be configured to specifically receive a recording command from the user and thus trigger a recording function to record a voice command issued from the user, and configured to further generate the tag for the unprocessed event that corresponds to the voice command.

In some embodiments, the ancillary device may additionally include a control module configured to perform a responsive event corresponding to the type of the unprocessed event, whereby the user can take an action in response to the responsive event.

Advantages of the disclosure may follow. As compared with the prior art, after receiving from the user a predefined input operation intended for the unprocessed event awaiting process sent from the terminal, the ancillary device can produce a tag for the unprocessed event, and further send the tag, containing the type and serial number of the unprocessed event, to the terminal, whereby the terminal can generate a corresponding notification message according to the tag to reminder the user when he later turns back to the terminal. In addition, the fact that each tag contains a type and a serial number allows the terminal to generate a notification message with respect to each tag and display it as a reminder for the user so that he can at first sight learn which event the reminder denotes. More to the point, the interaction between the ancillary device and the user is also enhanced, which greatly adds to the user experience.

DETAILED DESCRIPTION

Figure 1:
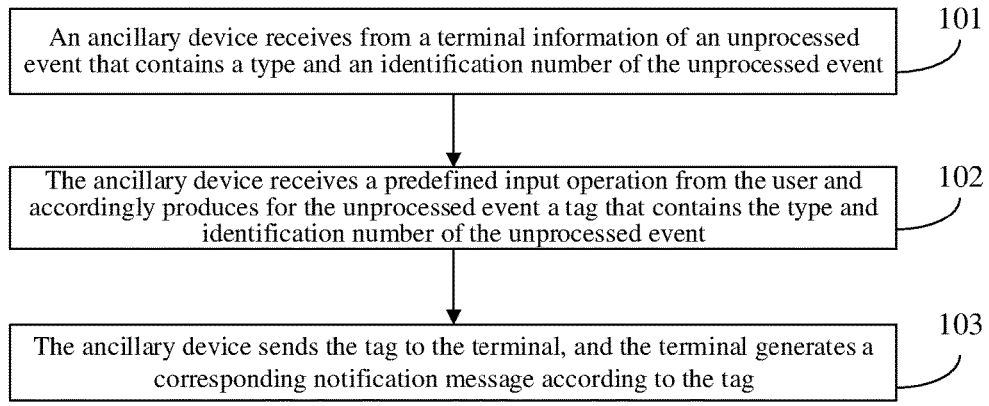
FIG. 1 is a flow diagram illustrating a method of controlling a terminal according to an embodiment of the disclosure.

Turning to FIG. 1, a flow diagram of a method of controlling a terminal according to an embodiment is depicted.

The method as illustrated may include the following blocks.

At block 101, the method includes an ancillary device receiving information of an unprocessed event from the terminal that contains a type and a serial number of the unprocessed event.

For sake of convenience, the user may typically use an ancillary device to handle the unprocessed event present on the terminal. To achieve that goal, the ancillary device may first build up a connection with the terminal, for example, it can be connected to the terminal via a wired or wireless connection. The terminal may comprise a smart phone, a tablet computer, a personal computer (PC), et cetera. The ancillary device may comprise a smart watch, smart glasses, or other wearables.

After the ancillary device has been connected to the terminal, once the terminal receives an event that needs to be attended to, it may send relevant information denoting the event as "unprocessed" to the ancillary device. The information may contain a type and a serial number of the unprocessed event. The type of the unprocessed event may comprise a call, a short text message (also called SMS), a multimedia message (also called MMS), an email, a message from social networking software, and so on.

The terminal may categorize and respectively mark the received different types of unprocessed events, and may further number the unprocessed events belonging to each same type. For example, if the terminal receives multiple short messages, it may number these messages, respectively, for example, by Arabic numerals, letters, or in any other numbering manner so long as whereby each unprocessed message could be assigned a unique serial number. Alternatively, different types of unprocessed events can be numbered consecutively. See table 1 below.

TABLE 1

| Serial Number | Type |
|---|---|
| ID1 | Call |
| ID2 | Short Text Message |
| ID3 | Multimedia Message |

After determining the types of and numbering the unprocessed events, the terminal may transmit at least one unprocessed event containing its type and serial number to the ancillary device, and the ancillary device may receive the unprocessed event accordingly.

At block 102, the method includes the ancillary device receiving a predefined input operation from the user and producing a tag for the unprocessed event that contains the type and serial number of the unprocessed event.

Figure 2:
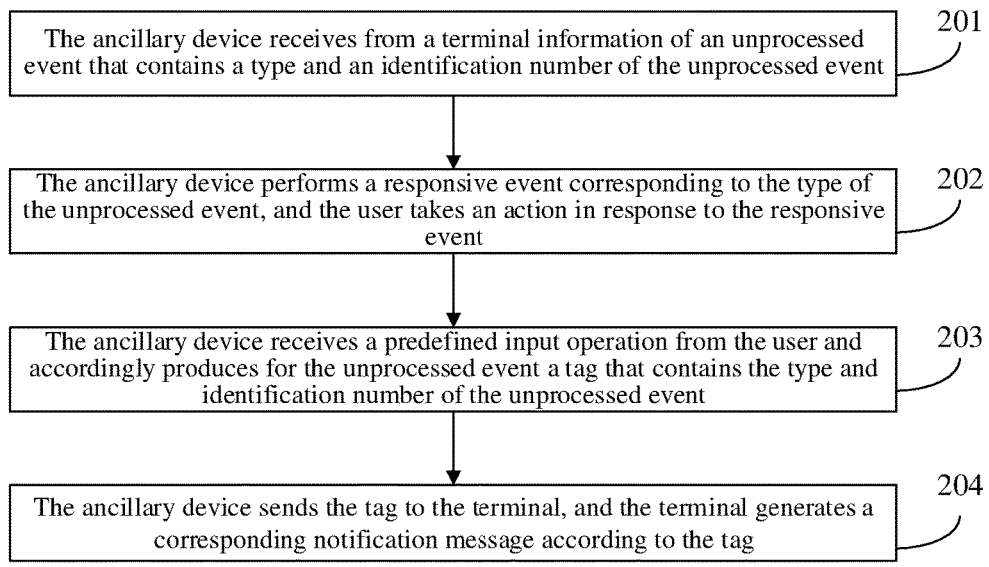
FIG. 2 is a detailed flow diagram of the method of controlling a terminal according to the embodiment as illustrated in FIG. 1.

Specifically, turning now to FIG. 2, a detailed flow diagram of the method of controlling a terminal according to the embodiment illustrated in FIG. 1 is depicted. The method may further include the following block, after the action of the ancillary device receiving the information of an unprocessed event from the terminal.

At block 202, the method includes the ancillary device performing a responsive event corresponding to the type of the unprocessed event, whereby the user can take an action in response to the responsive event.

After receiving the unprocessed event from the terminal, the ancillary device may first determine its type according to the type information contained therein, and then perform a responsive event corresponding to the type of the unprocessed event. For example, if the unprocessed event is a phone call, the ancillary device may perform a voice prompt to remind the user of the incoming phone call; if the unprocessed event is a short text message, the ancillary device may prompt the user by vibration; if the unprocessed event is a picture, the ancillary device may display the picture on its screen as a reminder. Note, the above examples are for illustration purposes only, but not for limitation. Generally, the responsive events can be configured from among the means provided on the ancillary device or be customized according to specific tasks.

The correspondences are shown in Table 2 below.

TABLE 2

| Serial Number | Type | Responsive Event |
|---|---|---|
| ID1 | Call | Responsive Event 1 |
| ID2 | Short Text Message | Responsive Event 2 |
| ID3 | Multimedia Message | Responsive Event 3 |

If the user is currently not convenient with handling the unprocessed event the ancillary device prompts, the user can input a predefined operation to the ancillary device, and, accordingly, the ancillary device may receive the input operation and produce a corresponding tag for the unprocessed event that may contain the type and serial number of the unprocessed event. The tag may serve as a detailed explanation of the predefined input operation. For example, if the user is currently busy and thus is not able to answer the incoming phone call, while relevant information of this unprocessed event, i.e., an incoming phone call, has been sent to the ancillary device to remind the user, the user can perform a predefined input operation on the ancillary device, whereby the ancillary device may generate a tag that says "The phone call is to be returned later". The tag may also be associated with the phone number that calls.

In one embodiment, the ancillary device may use sensors to detect an interactive operation from the user and thus further produce the tag for the corresponding unprocessed event according to the interactive operation. In some embodiments, the interactive operation may include, but not limited to, a touch operation, keystrokes, or a voice control operation. For example, if the ancillary device is touch-controlled, it can detect a touch command produced from the user's touch operation and accordingly generate the tag for the corresponding unprocessed event.

Alternatively, in one embodiment, the ancillary device can receive a voice command from the user and whereby produce the tag for the corresponding unprocessed event. Specifically, the ancillary device may first receive a recording command from the user—i.e., when it detects an operation by which the user intends to enable the recording function built in the ancillary device, the recording function would be triggered and the ancillary device may start recording the voice information from the user, to obtain a voice command eventually. The ancillary device may store the voice command and generate a tag accordingly.

At block 103, the method includes the ancillary device sending the tag to the terminal, so that the terminal generates a corresponding notification message according to the tag.

After producing the tag for the corresponding unprocessed event, the ancillary device may send the tag to the terminal whence the information of the unprocessed event is sent out, so that the terminal can generate a corresponding notification message according to the tag. The tag may contain the type and serial number of the unprocessed event so that the terminal can easily identify.

After generating the notification message according to the tag, the terminal can further display the notification message on a predefined position of the screen to notify the user.

For example, if the unprocessed event is a phone call while the user is currently not able to answer it and thus wants to mark this unprocessed event as "The call is to be returned later", the terminal can eventually generate a notification message, such as "Please return the phone call", after which the terminal may hang up this call and display the notification message at a predefined position on the screen. A conclusion can be reached that, when there are multiple unprocessed events present on the terminal, they can be displayed orderly according to their types and serial numbers, thus the user can easily identify each.

Alternatively, in one embodiment, the predefined input operation the ancillary device receives may be a voice command. The ancillary device may send the tag, plus the voice command, in a voice file format, to the terminal. After receiving the voice command, the terminal may parse it through a voice analysis module, and, once successfully identifying the specified information in the voice command, execute a command corresponding to the specified information, and further generate a notification message according to the tag to remind the user.

As compared with the prior art, after receiving from the user a predefined input operation intended for the unprocessed event awaiting process sent from the terminal, the ancillary device may produce a tag for the unprocessed event, and further send the tag, containing the type and serial number of the unprocessed event, to the terminal, whereby the terminal can generate a corresponding notification message according to the tag to remind the user of the unprocessed event. In addition, the fact that each tag contains a type and a serial number can allow the terminal to generate a notification message with respect to each unprocessed event and display it so that the user can easily identify which unprocessed event the notification message denotes. More to the point, the interaction between the ancillary device and the user is also enhanced, which greatly adds to the user experience.

Figure 3:
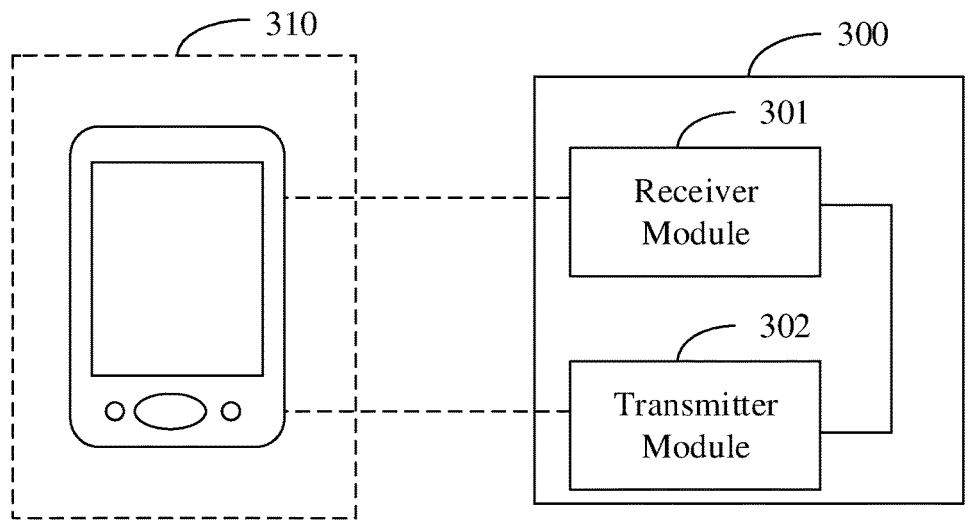
FIG. 3 is a block diagram of an ancillary device according to an embodiment of the disclosure.

Turning now to FIG. 3, a block diagram of an ancillary device according to an embodiment is depicted. Ancillary device 300 according to this embodiment includes a receiver module 301 and a transmitter module 302.

Receiver module 301 may be configured to receive from a terminal 310 the information of an unprocessed event that contains a type and a serial number of the unprocessed event.

For sake of convenience, the user may typically use an ancillary device 300 to handle the unprocessed event present on the terminal 310. The ancillary device 300 may first build up a connection with the terminal 310, for example, the ancillary device 300 may be connected to the terminal 310 via a wired or wireless connection. The terminal 310 may include, but not limited to, a smart phone, a tablet computer, a personal computer (PC), et cetera. The ancillary device 300 may comprise a smart watch, smart glasses, or other wearables.

After the ancillary device 300 has been connected to the terminal 310, once the terminal 310 receives an event that needs to be attended to, it may send relevant information denoting the event as "unprocessed" to the ancillary device 300. The information may contain the type and the serial number of the unprocessed event. The type of the unprocessed event may include, but not limited to, a call, a short text message, a multimedia message, an email, a message from social networking software, and so on.

The terminal 310 may categorize and respectively mark the received different types of unprocessed events, and may further number the unprocessed events belonging to a same type. For example, if the terminal 310 receives multiple short messages, it may number these messages, respectively, for example, by Arabic numerals, letters, or in any other numbering manner so long as whereby each unprocessed message could be assigned a unique serial number. Alternatively, different types of unprocessed events as a whole can be numbered consecutively.

After determining the types of and numbering the unprocessed events, the terminal 310 may transmit relevant information of at least one unprocessed event, containing the type and the serial number of the unprocessed event, to the ancillary device 300, accordingly, the receiver module 301 may receive the information of the unprocessed event.

The receiver module 301 may be further configured to receive a predefined input operation from a user and accordingly produce a tag for the unprocessed event, wherein the tag may contain the type and serial number of the unprocessed event.

Figure 4:
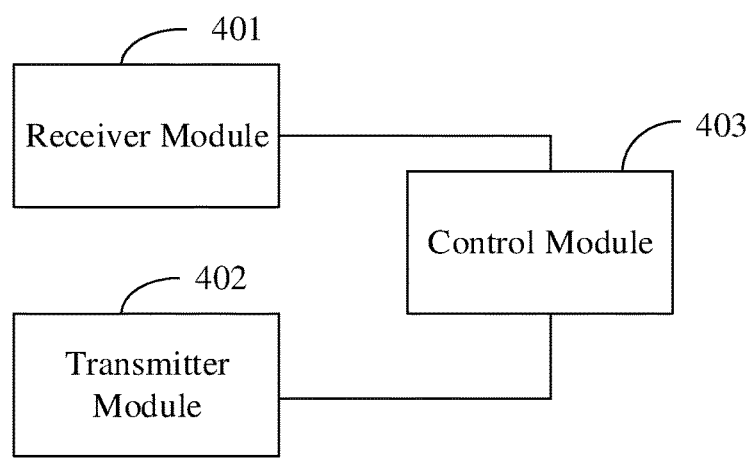
FIG. 4 is a block diagram of an ancillary device according to another embodiment of the disclosure.

After the receiver module 301 receives the information of the unprocessed event from the terminal, the ancillary device may process the unprocessed event. Specifically, referring now to FIG. 4, a block diagram of an ancillary device is depicted that further includes a control module 403 on the basis of the ancillary device according to the embodiment as illustrated in FIG. 3. The control module 403 may be configured to determine the type of the unprocessed event according to the type information contained therein, and then perform a responsive event corresponding to the unprocessed event. For example, if the unprocessed event is a phone call, the ancillary device may perform a voice prompt to remind the user of the incoming phone call; if the unprocessed event is a short message, the ancillary device may remind the user by vibration; if the unprocessed event is a picture, the ancillary device may show the picture on its screen to notify the user. Note, the above examples are for illustration purposes only, but not for limitation. In general, the responsive events can be configured from among the means provided on the ancillary device or be customized according to specific tasks.

Referring back to FIG. 3, if the user is currently not convenient with handling the unprocessed event the ancillary device 300 prompts, the user can input a predefined operation to the ancillary device 300, and, accordingly, the receiver module 301 may receive the input operation and produce a tag for the corresponding unprocessed event, where the tag may contain the type and serial number of the unprocessed event. The tag may serve as a detailed explanation of the predefined input operation. For example, if the user is currently busy and thus is not able to answer the incoming phone call, while relevant information of this unprocessed event. i.e., an incoming phone call, has been sent to the ancillary device to remind the user, the user can perform a predefined input operation on the ancillary device 300, whereby the ancillary device 300 may generate a tag that says "The phone call is to be returned later". The tag may also be associated with the phone number that initiates the call.

In one embodiment, the receiver module 301 may detect through sensors an interactive operation from the user and thus further produce the tag for the corresponding unprocessed event according to the interactive operation. In some embodiments, the interactive operation may include, but not limited to, a touch operation, keystrokes, or a voice control operation. For example, if the ancillary device 300 is touch-controlled, it can detect a touch command produced from the user's touch operation and accordingly generate the tag for the corresponding unprocessed event.

Alternatively, in one embodiment, the receiver module 301 can receive a voice command from the user and whereby produce the tag for the corresponding unprocessed event. Specifically, the receiver module 301 may first receive a recording command from the user—i.e., when it detects the operation by which the user intends to enable the recording function built in the ancillary device 300, the recording function would be triggered and the ancillary device may start recording the voice information from the user, to obtain a complete voice command eventually. The receiver module 301 may store the voice command and generate a tag accordingly.

The transmitter module 302 may be configured to send the tag to the terminal, so that the terminal may generate a corresponding notification message according to the tag.

After the receiver module 301 produces the tag for the corresponding unprocessed event, the transmitter module 302 may send the tag to the terminal 310 whence the unprocessed event comes from, so that terminal 310 can generate a corresponding notification message according to the tag. The tag may contain the type and the serial number of the unprocessed event so that the terminal can easily identify.

The terminal 310 may receive the tag and then generate the notification message according to the tag, and further display the notification message on a predefined position on the screen to remind the user.

For example, if the unprocessed event is a phone call while the user is currently not able to answer and thus wants to mark the unprocessed event as "The call is to be returned later", the terminal 310 can eventually generate a notification message, such as "Please return the phone call", after which the terminal 310 may hang up this call and display the notification message at a predefined position on the screen. A conclusion can thus be drawn that, when there are multiple unprocessed events present on the terminal, they can be displayed orderly according to their types and serial numbers, thus the user can easily identify each.

Alternatively, in one embodiment, the predefined input operation the receiver module 301 receives may be a voice command. The transmitter module 302 may send the tag, plus the voice command, in a voice file format, to the terminal 310. After receiving the voice command, the terminal 310 may parse it through a voice analysis module, and, once successfully identifying the specified information in the voice command, execute a command corresponding to the specified information, and further generate a notification message according to the tag to remind the user.

As compared with the prior art, after the receiver module receives from the user a predefined input operation intended for an unprocessed event awaiting process sent from the terminal, the ancillary device may produce a tag for the unprocessed event and the transmitter module may further send the tag, containing the type and serial number of the unprocessed event, to the terminal, whereby the terminal can generate a corresponding notification message according to the tag to remind the user. In addition, the fact that each tag contains a type and a serial number can allow the terminal to eventually generate a notification message with respect to each unprocessed event so that the user can easily identify which unprocessed event the notification message denotes. More to the point, the interaction between the ancillary device and the user is also enhanced, which greatly adds to the user experience.

The above description merely depicts some exemplary embodiments of the disclosure, but is not limiting the scope of the disclosure. Any equivalent structure or flow transformations made to the disclosure, or any direct or indirect applications of the disclosure on any other related fields, shall all be covered within the protection of the disclosure.

What is claimed is:

1. A method of controlling a terminal, comprising:
   receiving, by an ancillary device, information of an unprocessed event from the terminal, wherein the information contains a type and a serial number of the unprocessed event; the serial number of the unprocessed event is a number of the unprocessed event of a plurality of unprocessed events received by the terminal, which either belong to a same type and are numbered consecutively or belong to different types and are numbered consecutively;
   performing, by the ancillary device, a responsive event corresponding to the type of the unprocessed event to remind a user; wherein the responsive event is a prompt generated by the ancillary device to remind the user;
   if currently not convenient for the user to handle the unprocessed event prompted by the ancillary device, receiving a predefined input operation from the user by the ancillary device, wherein the predefined input operation is an interactive operation between the user and the ancillary device, such that the ancillary device produces a tag for the unprocessed event according to the interactive operation, the tag indicating the unprocessed event still has not been handled by the user;
   sending, by the ancillary device, the tag to the terminal, so that the terminal generates a corresponding notification message according to the tag.

2. The method according to claim 1, wherein the type of the unprocessed event comprises a phone call, a short text message, a multimedia message, or an e-mail.

3. The method according to claim 1, wherein the interactive operation comprises a touch operation, keystrokes, or a voice control operation.

4. The method according to claim 1, wherein the ancillary device receives a voice command from the user, whereby producing the tag for the corresponding unprocessed event.

5. The method according to claim 1, wherein the interactive operation is a touch operation, the ancillary device detects a touch command produced from the user's touch operation and accordingly generates the tag for the corresponding unprocessed event.

6. The method according to claim 1, wherein when the type of the unprocessed event is a phone call, the responsive event generated by the ancillary device is a voice prompt to remind the user of the incoming phone call; when the type of the unprocessed event is a short text message, the responsive event generated by the ancillary device is a vibration prompt; and when the type of the unprocessed event is a picture, the responsive event generated by the ancillary device is displaying the picture on a screen of the ancillary device as a reminder, such that the responsive events are different from each other according to the types of the unprocessed events.

7. The method according to claim 1, wherein when the unprocessed event is a phone call while the user is currently not convenient with handling the unprocessed event, the tag generated by the ancillary device is, "The phone call is to be returned later," and is associated with a phone number that calls, and the notification message generated by the terminal is, "Please return the phone call," which is not sent to a caller with the phone number that calls.

8. A method of controlling a terminal, comprising:
receiving, by an ancillary device, information of an unprocessed event from the terminal, wherein the information contains a type and a serial number of the unprocessed event; wherein the serial number of the unprocessed event is a number of the unprocessed event of a plurality of unprocessed events received by the terminal, which either belong to a same type and are numbered consecutively or belong to different types and are numbered consecutively;
if currently not convenient for the user to handle the unprocessed event prompted by the ancillary device, receiving, by the ancillary device, a predefined input operation from a user and producing a tag for the unprocessed event the tag indicating the unprocessed event still has not been handled by the user; and
sending the tag to the terminal, so that the terminal generates a corresponding notification message according to the tag.

9. The method according to claim 8, wherein the type of the unprocessed event comprises a phone call, a short text message, a multimedia message, or an e-mail.

10. The method according to claim 8, wherein the block of the ancillary device receiving the predefined input operation from the user and producing the tag comprises:
detecting, by the ancillary device, an interactive operation between the user and the ancillary device, and producing the tag for the unprocessed event according to the interactive operation.

11. The method according to claim 10, wherein the interactive operation comprises a touch operation, keystrokes, or a voice control operation.

12. The method according to claim 8, wherein the block of the ancillary device receiving the predefined input operation from the user and producing the tag comprises:
receiving, by the ancillary device, a recording command from the user and triggering a recording function to record a voice command issued by the user, and generating for the unprocessed event the tag that corresponds to the voice command.

13. The method according to claim 8, further comprising, before the block of the ancillary device receiving the predefined input operation from the user and producing the tag:
performing a responsive event corresponding to the type of the unprocessed event, whereby the user takes an action in response to the responsive event; wherein the responsive event is a prompt generated by the ancillary device to remind the user.

14. The method according to claim 8, wherein when the type of the unprocessed event is a phone call, the responsive event generated by the ancillary device is a voice prompt to remind the user of the incoming phone call; when the type of the unprocessed event is a short text message, the responsive event generated by the ancillary device is a vibration prompt; and when the type of the unprocessed event is a picture, the responsive event generated by the ancillary device is displaying the picture on a screen of the ancillary device as a reminder, such that the responsive events are different from each other according to the types of the unprocessed events.

15. The method according to claim 8, wherein when the unprocessed event is a phone call while the user is currently not convenient with handling the unprocessed event, the tag generated by the ancillary device is, "The phone call is to be returned later," and is associated with a phone number that calls, and the notification message generated by the terminal is, "Please return the phone call," which is not sent to a caller with the phone number that calls.

16. An ancillary device used to control a terminal, comprising a receiver and a transmitter, wherein,
the receiver is configured to receive information of an unprocessed event from the terminal, wherein the information contains a type and a serial number of the unprocessed event; the serial number of the unprocessed event is a number of the unprocessed event of a plurality of unprocessed events received by the terminal which either belong to a same type and are numbered consecutively or belong to different types and are numbered consecutively;
the receiver is further configured to receive a predefined input operation from a user and produce a tag for the unprocessed event, when currently not convenient for the user to handle the unprocessed event prompted by the ancillary device, wherein the tag indicates the unprocessed event still has not been handled by the user; and
the transmitter is configured to forward the tag to the terminal, so that the terminal generates a corresponding notification message according to the tag.

17. The ancillary device according to claim 16, wherein the receiver is configured to detect an interactive operation between the user and the ancillary device, and produce the tag for the unprocessed event according to the interactive operation.

18. The ancillary device according to claim 17, wherein interactive operation comprises a touch operation, keystrokes, or a voice control operation.

19. The ancillary device according to claim 16, wherein the receiver is configured to receive a recording command from the user and trigger a recording function to record a voice command issued from the user, and further configured to generate the tag for the unprocessed event that corresponds to the voice command.

20. The ancillary device according to claim 16, further comprising a controller configured to perform a responsive event corresponding to the type of the unprocessed event, so that the user takes an action in response to the responsive event.

21. The ancillary device according to claim 16, wherein the type of the unprocessed event comprises a phone call, a short text message, a multimedia message, or an e-mail.

* * * * *